United States Patent [19]

Inuzuka

[11] Patent Number: 5,784,502
[45] Date of Patent: Jul. 21, 1998

[54] INTERPOLATION APPARATUS

[75] Inventor: Atsushi Inuzuka, Kanagawa, Japan

[73] Assignee: Sony Corporation, Tokyo, Japan

[21] Appl. No.: 593,710

[22] Filed: Jan. 29, 1996

[30] Foreign Application Priority Data

Jan. 31, 1995 [JP] Japan .................... 7-014682

[51] Int. Cl.$^6$ .................... G06K 9/32
[52] U.S. Cl. .................... 382/300; 358/525
[58] Field of Search .................... 358/428, 520, 358/525; 382/167, 300; 348/631

[56] References Cited

U.S. PATENT DOCUMENTS 5,016,103  5/1991  Rabii .................... 358/166

FOREIGN PATENT DOCUMENTS 2205713  12/1988  United Kingdom .......... H04N 5/14

Primary Examiner—Thomas D. Lee
Assistant Examiner—Jerome Grant, II
Attorney, Agent, or Firm—Jay H. Maioli

[57] ABSTRACT

A multi-point interpolation apparatus for reading out plural picture data from a picture memory and effecting interpolation includes apparatus that writes luminance data and chroma data of pixel data at (n+1) point pixel positions at the same address of a picture memory, and reads out luminance data and chroma data from the picture memory. The apparatus also selects, from the luminance data and chroma data of the pixel data at the read-out (n+1) point pixel positions, the luminance data and the chroma data at the n-point pixel positions, while generating, from the luminance data and the chroma data at the selected n-point pixel positions, the luminance data and the chroma data at the designated interpolating point by n-point interpolation.

3 Claims, 9 Drawing Sheets

INTERPOLATION APPARATUS

BACKGROUND OF THE INVENTION

This invention relates to a multi-point interpolation apparatus for reading out plural picture data from a picture memory for effecting interpolation.

In a digital multi-effector (DME), there are occasions where pixel loss is incurred in a deformed picture produced on applying deformation to picture data. In such case, interpolation is carried out for compensating such pixel loss. This interpolation is in need of data other than that at sampling points. Therefore, it becomes necessary to perform processing for selecting pixel data in the vicinity of a point in an input picture associated with the position of the pixel to be interpolated subsequent to deformation. The interpolation circuit for calculating the interpolation value using these data represents a crucial factor influencing the picture quality of picture data on which special effects have been applied by the DME device. Such interpolation circuit is in need of a picture memory for carrying out the interpolation on the picture data.

Many interpolation circuits require separate picture memories for luminance (Y) signals and chroma (C) signals, as shown in FIG.1. That is, the Y data separated by a Y/C separation circuit 51 is stored in a picture memory for Y 52 controlled for write/readout by a memory controller 53. Of the Y data, n points are read out and routed via a selector 54 to an interpolation circuit for Y 55. The interpolated Y data are outputted by the interpolation circuit for Y 55. On the other hand, the C data separated by a Y/C separation circuit 51 is stored in a picture memory for C 56 controlled for write/readout by a memory controller 57. Of the C data, n points are read out and routed via a selector 58 to an interpolation circuit for C 59. The interpolated C data are outputted by the interpolation circuit for C 59.

The reason mainly resides in the difference in sampling points between the data Y and the data C according to the D1 standard and in the difference in sampling points of the C data in the D1 and D2 standards. The D1 standard is the digital standard for component signals for studio as shown in Encoding Standard Recommendations 601 promulgated by CCIR. The Recommendations 601 provide the common sampling frequency, number of effective pixels per line, number of quantization bits and filter characteristics for bandwidth limitation for 525 line system and for the 625 line system. Thus the D1-VTR recording component signals according to the recommendations 601 is able to cope with the 525 line system or with the 625 line system subject to a switch changeover operation. However, since the studio system is centered about composite signals, and hence the demand for a composite digital VTR is strong, the D2 format has been prescribed by SMPTE.

Recently, there is a strong demand for high picture quality with DME, such that it has become increasingly necessary to carry out multi-point interpolation using multiple points in the vicinity of a calculation point for realization of smoother and more spontaneous interpolation.

However, with the above-described interpolation circuit, different picture memories and readout/write circuits are required for the Y-data and the C-data. With multi-point (n-point) interpolation, the division volume is increased, such that the number of each of the picture memories 52, 56 for the Y and C data and the number of each of the memory control circuits 53 and 57, as memory peripheral circuits, is increased to as many as 2n in total, thus giving rise to inconveniences in occupied space and power consumption.

SUMMARY OF THE INVENTION

It is an object of the present invention to provide a multipoint interpolation circuit in which Y-data and C-data may be accessed on the same memory such that the memory and the peripheral circuit may be diminished to achieve saving in occupied area and power consumption.

According to the present invention, there is provided an interpolation apparatus for reading out pixel data at a plurality of pixel positions from a picture memory and for generating pixel data at a designated interpolating point by n-point interpolation. The interpolation apparatus includes memory control circuitry for writing luminance data and chroma data of pixel data at (n+1) point pixel positions at the same address of a picture memory and for reading out the luminance data and the chroma data from the picture memory, selection circuitry for selecting luminance data and chroma data at n-point pixel positions from the luminance data and the chroma data of pixel data at (n+1) point pixel positions read out by the memory control circuitry from the picture memory, luminance data interpolation circuitry for generating luminance data at a designated interpolating point by the n-point interpolation from luminance data at the n-point pixel positions selected by the selection circuitry, and chroma data interpolation circuitry for generating chroma data at the designated interpolating point by the n-point interpolation from chroma data at the n-point pixel positions selected by the selection means.

With the multi-point interpolation apparatus of the present invention, memory control circuitry writes luminance data and chroma data of (n+1) points of the pixel data at the same address of the picture memory, while independently reading out (n+1) points of the luminance data and the chroma data. The selection circuitry selects n-points each of luminance and chroma data from the (n+1) point luminance data and chroma data, and routes the selected data to interpolation means for luminance data and interpolation circuitry for chroma data in order to effect multi-point interpolation at the interpolating point. This diminishes the space taken up by the picture memory and the peripheral circuit for saving the occupied space and the power consumption.

DETAILED DESCRIPTION OF THE PREFERRED EMBODIMENTS

Figure 1:
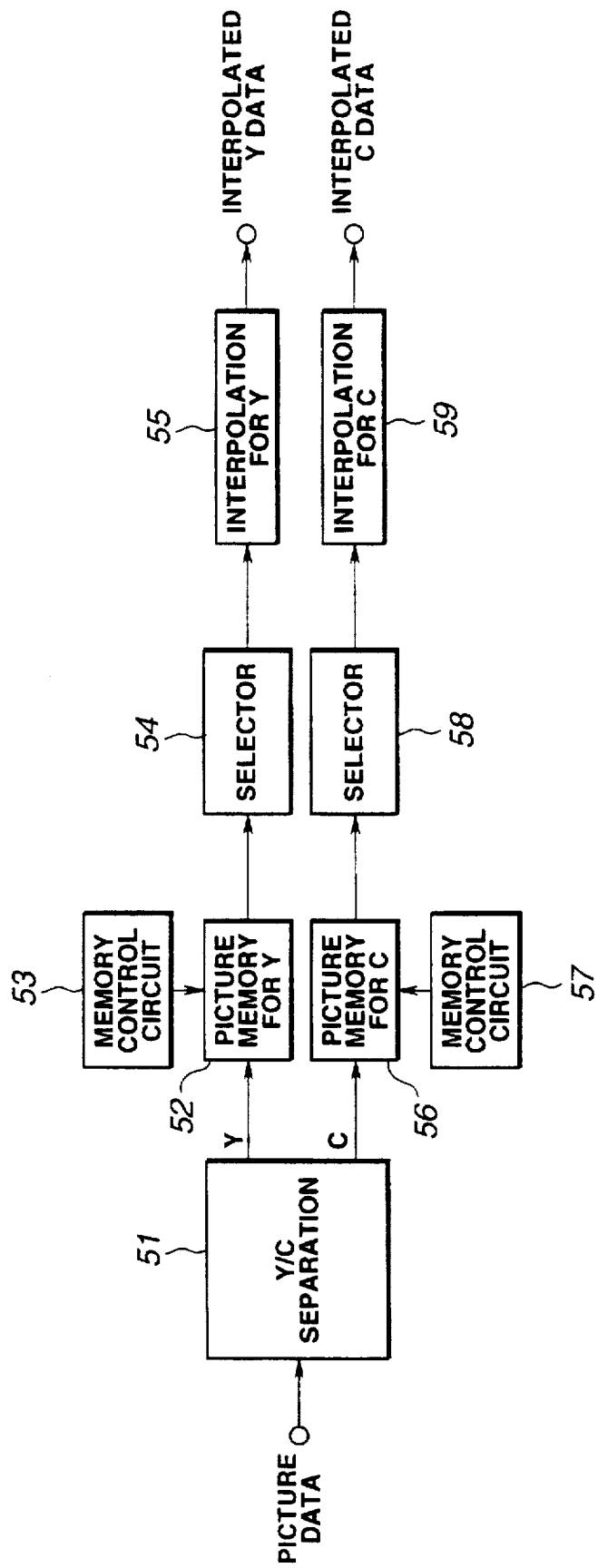
FIG. 1 is a block diagram showing a typical example of a multi-point interpolation circuit.
Figure 2:
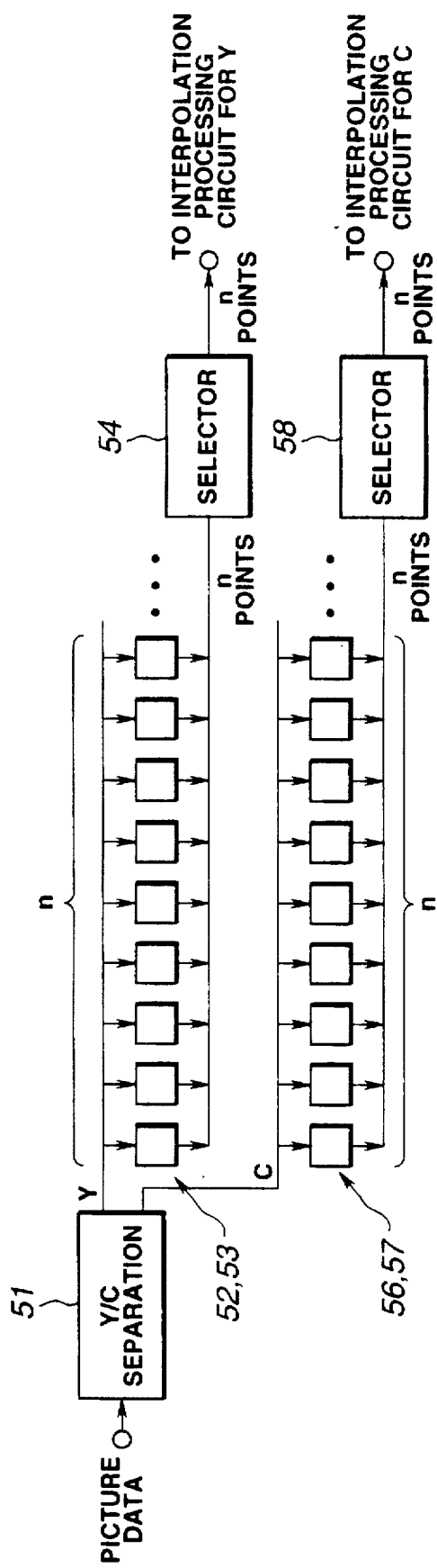
FIG. 2 illustrates typical examples of a memory and a peripheral circuit of the conventional multi-point interpolation circuit.

Referring to the drawings, preferred embodiments of a multi-point interpolation circuit according to the present invention will be explained in detail.

The multi-point interpolation circuit of the instant embodiment may be preferentially employed in a digital multi-effector (DME) for processing digital picture signals by picture information processing, such as synthesis, deformation or color conversion.

With the DME device, an increasing demand for higher picture quality has recently been raised, such that an interpolation circuit capable of performing smoother and spontaneous interpolation is needed. The multi-point interpolation circuit effects interpolation using multiple points in the vicinity of a point being calculated. In particular, the multi-point interpolation circuit of the instant embodiment is configured so that an address is directly applied to picture data comprised of luminance (Y) data and chroma (C) data for writing transiently in a picture memory and the picture data thus stored is read out in accordance with the address for reading out the picture data.

Figure 3:
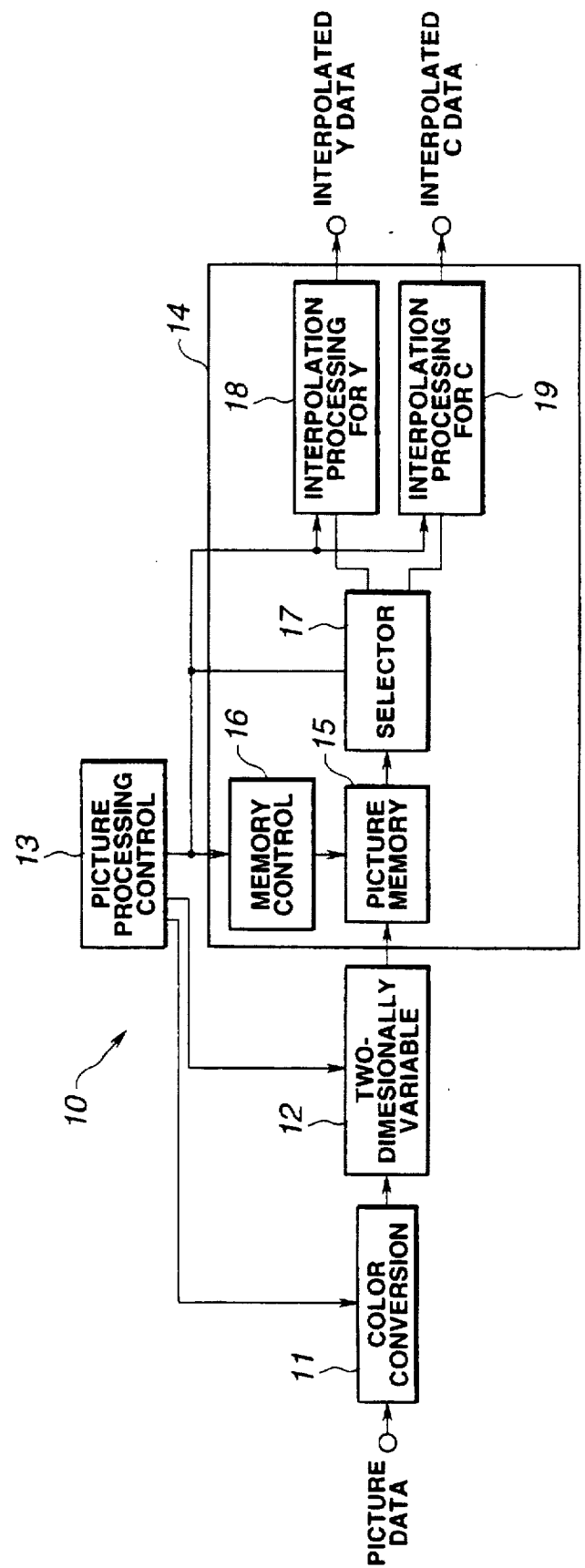
FIG. 3 is a block diagram showing an embodiment of a multipoint interpolation circuit according to the present invention.

Before explaining the multi-point interpolation circuit, the DME processing unit, a picture processor of the DME device, is explained by referring to FIG. 3. The DME processing unit 10 has enclosed therein a multi-point interpolation circuit 14.

The DME processing unit 10 performs picture processing, such as picture generation or synthesis, or painting. The DME processing unit 10 has a color conversion circuit 11, a two dimensional variable LPF 12, a picture processing controller 13 and the multi-point interpolation circuit 14, as shown in FIG. 3. Of these, the multi-point interpolation circuit 14 is comprised of a picture memory 15, a memory controller 16, a selector 17, an interpolation processing circuit for Y 18 and an interpolation processing circuit for C 19.

The color conversion circuit 11 converts the colors of respective pixels of the picture data, made up of the Y and C data, in accordance with commands by the picture processing controller 13. In general, various colors are comprised of three colors R, G and B or Y, R-Y and B-Y, and may be converted by varying the mixing ratio. The two-dimensional variable LPF 12 has the low-pass filter function of performing anti-aliasing prior to processing for contraction. Since the tap coefficients of the two-dimensional variable LPF 12 can be changed in accordance with instructions by the picture processing controller 13, the low-frequency pass-band can be varied depending upon the extent of contraction. The low-pass filter function may also be exploited for blurring, termed defocusing, which is among the special effects.

The memory controller 16 of the multi-point interpolation circuit 14 writes Y-data and C-data of (n+1) point picture data at the same address on the picture memory 15, while reading out (n+1) points of the Y data and the C data independently of each other. The selector 17 selects n points of the Y data and the C data from the (n+1) point Y data and the (n+1) point C data read out from the picture memory 15 under control by the memory controller 16. The interpolation circuit for Y 18 performs n-point interpolation at the interpolating point (point to be interpolated) using n points of the Y data selected by the selector 17. The interpolation circuit 19 performs n-point interpolation at the interpolation point using the n points of the C data selected by the selector 17.

The memory controller 16 writes the Y data and the C data in the picture memory 15 in accordance with the picture processing controller 13. The memory controller 16 also generates write/readout addresses for reading out the Y data and the C data from the picture memory 15 for controlling the writing/readout for the picture memory 15. The picture processing controller 13 also controls the operations of the selector 17, interpolation circuit 18 for Y 18 and the interpolation circuit for C 19, in addition to controlling the operation of the memory controller 16.

With the above-described DME processing unit 10, the picture data, color-converted by the color conversion circuit 11 and anti-aliased by the two-dimensional variable LPF 12, can be interpolated by multi-point interpolation by the multi-point interpolation circuit 14 for outputting the interpolated Y and C data for forming a smoother and more spontaneous picture.

The operation of the multi-point interpolation circuit 14 is now explained with reference to an example of eight-point interpolation (n=8). First, picture data made up of the Y and C data via the two-dimensional variable LPF 12 are written at the same address of the picture memory 15 in accordance with the write address signals generated by the memory controller 16 under instructions by the picture processing controller 13. As an example, the picture data is a 16-bit data, of which the upper 8 bits and the lower 8 bits represent the Y and C data, respectively.

Figure 4:
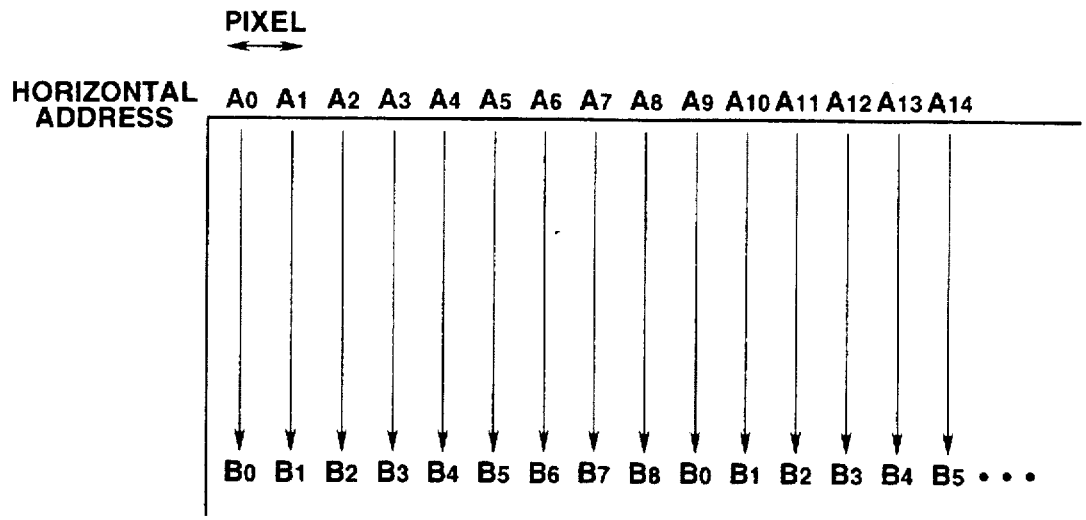
FIG. 4 is a diagrammatic view for illustrating the construction of a picture memory of the multi-point interpolation circuit shown in FIG. 3.

At this time, the picture data is stored, under control by the memory controller 16, in (n+1) (=9) memory banks in the horizontal direction of picture data, as shown in FIG. 4. These nine split portions are termed memory banks $B_0$, $B_1$, $B_2$, $B_3$, $B_4$, $B_5$, $B_6$, $B_7$ and $B_8$.

When the interpolation point is commanded to the picture processing controller 13, the picture processing controller 13 controls the memory controller 16 to generate readout addresses for reading out split picture data of four left points and five right points with respect to the interpolating point from the picture memory 15. The memory controller 16 generates the 9-point addresses and routes the addresses to the picture memory 15 for reading out the corresponding nine Y and C data from the memory banks. The readout address signals are generated by readout address converters associated with the memory banks $B_0$, $B_1$, $B_2$, $B_3$, $B_4$, $B_5$, $B_6$, $B_7$ and $B_8$ as will be explained subsequently. The nine Y and C data, read out from the memory banks $B_0$, $B_1$, $B_2$, $B_3$, $B_4$, $B_5$, $B_6$, $B_7$ and $B_8$, are routed to the selector 17. The selector 17 re-arrays the nine Y and C data read out from the picture memory 15 in accordance with the horizontal address and subsequently selects eight Y and C data.

The selector 17 performs data selection for a case in which the C data is the chroma data of the D1 format and the readout address directly previous to the interpolating point is an even-numbered address in a different manner from other cases. That is, if the C data is the chroma data of the D1 format, and the readout address directly before the interpolating point is an even-numbered address, the selector 17 re-arrays nine C data and subsequently selects from the nine data eight C data beginning from the right-hand side C data having the largest readout address.

If the C data is of the D1 format, and the readout address directly before the interpolating point is an odd-numbered address, the C data is of the D2 format, or if the data is the Y data, the data is re-arrayed and eight points are selected beginning from the left-hand side.

The eight Y data, selected by the selector 17, are routed to the interpolation circuit for Y 18, while the eight C data, selected by the selector 17, are routed to the interpolation circuit for C 19. The interpolation circuit for Y 18 and the interpolation circuit for C 19 perform eight-point interpolation at the interpolating point, using the eight luminance data and the eight chroma data, for outputting interpolated luminance data Y and interpolated C data.

Figure 5:
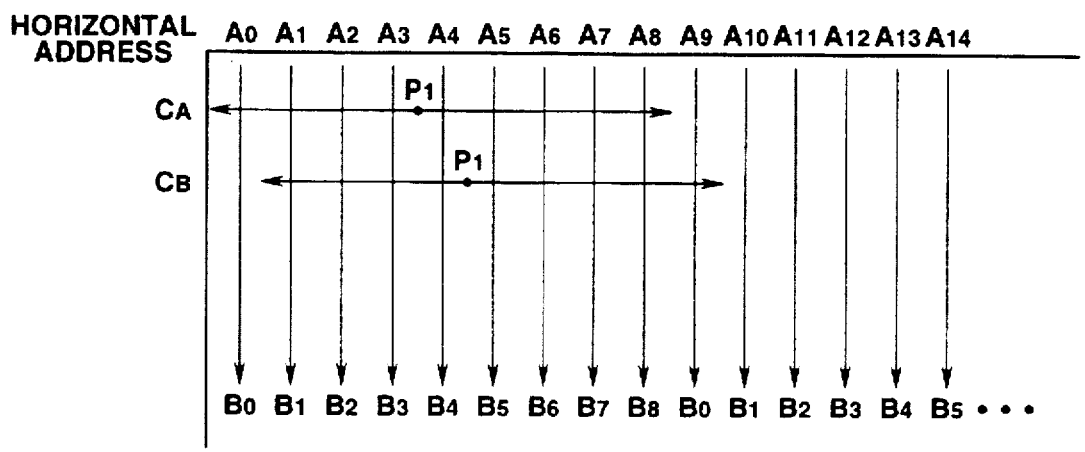
FIG. 5 is a diagrammatic view for illustrating the positions of the interpolating points on the picture memory.
Figure 6:
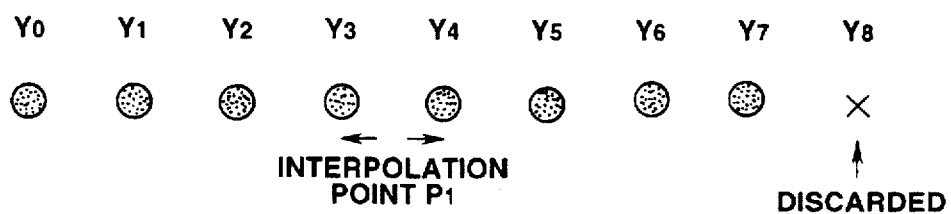
FIG. 6 is a diagrammatic view for illustrating the interpolation for luminance data by the multi-point interpolation circuit shown in FIG. 3.

The operation for the picture data being Y data is explained by referring to FIGS. 5 and 6. If the interpolating point $P_1$, is commanded by the picture processing controller 13, the memory controller 16 reads out from the picture memory 15 four left points and right five points of the Y data with respect to the interpolating point $P_1$. If the interpolating point $P_1$ specifies an address $A_{3.5}$ between the horizontal address $A_3$ and the horizontal address $A_4$, the memory controller 16 reads out luminance data $Y_0$, $Y_1$, $Y_2$, $Y_3$, $Y_4$, $Y_5$, $Y_6$, $Y_7$ and $Y_8$ from the memory banks $B_0$, $B_1$, $B_2$, $B_3$, $B_4$, $B_5$, $B_6$, $B_7$ and $B_8$. FIG.6 shows the relative position between the luminance data $Y_0$,O , $Y_1$, $Y_2$, $Y_3$, $Y_4$, $Y_5$, $Y_6$, $Y_7$ and $Y_8$ and the interpolating point $P_1$. The selector 17 discards the rightmost luminance data $Y_8$ and selects the luminance data $Y_0$, $Y_1$, $Y_2$, $Y_3$, $Y_4$, $Y_5$, $Y_6$ and $Y_7$ to transmit the selected data to the interpolation circuit for Y 18. The interpolation circuit for Y 18 calculates an interpolated value for the interpolating point $P_1$, using the luminance data $Y_0$, $Y_1$, $Y_2$, $Y_3$, $Y_4$, $Y_5$,$Y_6$ and $Y_7$, and outputs the calculated interpolated Y data.

Figure 7:
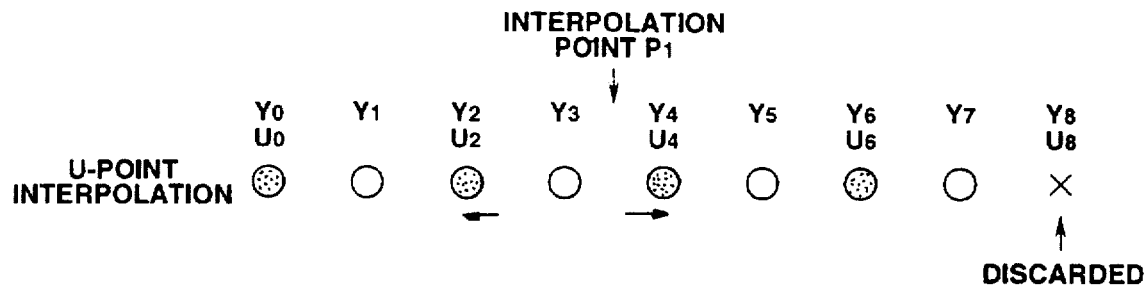
FIG. 7 is a diagrammatic view for illustrating the operation of interpolation of the multi-point interpolation circuit shown in FIG. 3, with the chroma data being chroma data U of D1 format and the address directly before the interpolating point being an odd-number address.
Figure 8:
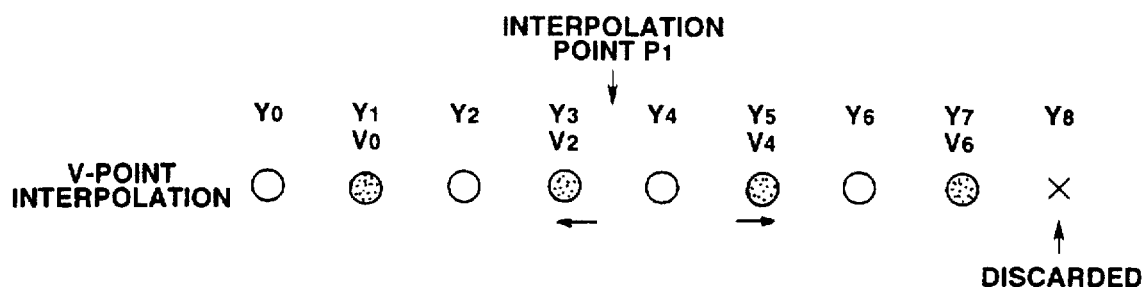
FIG. 8 is a diagrammatic view for illustrating the operation of interpolation of the multi-point interpolation circuit shown in FIG. 3, with the chroma data being chroma data V of D1 format and the address directly before the interpolating point being an odd-number address.

The operation for the data being of the D1 format and the interpolating point $P_1$ specifying an address $A_{3.5}$ between the horizontal address $A_3$ and the horizontal address $A_4$, as in a case $C_A$ in FIG.5, is explained. In such case, the chroma data is divided into U data and V data, as shown in Figs.7 and 8.

The chroma data $U_0$, $U_2$, $U_4$, $U_6$ and $U_8$ and the chroma data $V_0$, $V_2$, $V_4$, $V_6$ and $V_8$ are sampled in association with the luminance data $Y_0$, $Y_2$, $Y_4$, $Y_6$ and $Y_8$. It is noted however that, while the chroma data $U_0$, $U_2$, $U_4$, $U_6$ and $U_8$ are arrayed at the positions of the luminance data $Y_0$, $Y_2$, $Y_4$, $Y_6$ and $Y_8$, the chroma data $V_0$, $V_2$, $V_4$, $V_6$ and $V_8$ are arrayed at the positions of the luminance data $Y_1$, $Y_3$, $Y_5$, $Y_7$ and $Y_9$.

The memory controller 16 reads out the chroma data $U_0$, $U_2$, $U_4$, $U_6$ and $U_8$ from the memory banks $B_0$, $B_2$, $B_4$, $B_6$ and $B_8$. FIG.7 shows the positions of the chroma data $U_0$, $U_2$, $U_4$, $U_6$ and $U_8$ with respect to the luminance data $Y_0$, $Y_1$, $Y_2$, $Y_3$, $Y_4$, $Y_5$, $Y_6$, $Y_7$ and $Y_8$, and the interpolating point $P_1$. The even-numbered Y and U data are associated with each other as described above. Since interpolating point $_1$ is positioned between the horizontal address $A_3$ and the horizontal address $A_4$, the selector 17 selects the left two points of the chroma data $U_2$ and $U_0$, right two points of the chroma data $U_4$ and $U_6$, totalling four chroma data $U_0$, $U_2$, $U_4$ and $U_6$, from data between the chroma data $U_2$ and the chroma data $U_4$, while discarding the chroma data $U_8$. These chroma data $U_0$, $U_2$, $U_4$, $U_6$ are sent to the interpolation circuit for C 19.

The memory controller 16 reads out the chroma data $V_0$, $V_2$, $V_4$ and $V_6$ from the memory banks $B_1$, $B_3$, $B_5$ and $B_7$. FIG.8 shows the positions of the chroma data $V_0$, $V_2$, $V_4$, $V_6$ and $V_8$ with respect to the luminance data $Y_0$, $Y_1$,$Y_2$, $Y_3$, $Y_4$, $Y_5$, $Y_6$, $Y_7$ and $Y_8$ and the interpolating point $P_1$. Since interpolating point $P_1$ is positioned between the horizontal address $A_3$ and the horizontal address $A_4$, the selector 17 selects the left two points of the chroma data $V_2$ and $V_0$, right two points of the chroma data $V_4$ and $V_6$ totalling four chroma data $V_0$, $V_2$, $V_4$ and $V_6$, from data between the chroma data $V_2$ and the chroma data $V_4$. These chroma data $V_0$, $V_2$, $V_4$ and $V_6$ are sent to the interpolation circuit for C 19.

Using the eight chroma data, that is chroma data $U_0$, $U_2$, $U_4$ and $U_6$ and the chroma data $V_0$, $V_2$, $V_4$ and $V_6$, the interpolation circuit for C 19 performs multi-point interpolation on the interpolating point $P_1$ and outputs interpolated C data.

Figure 9:
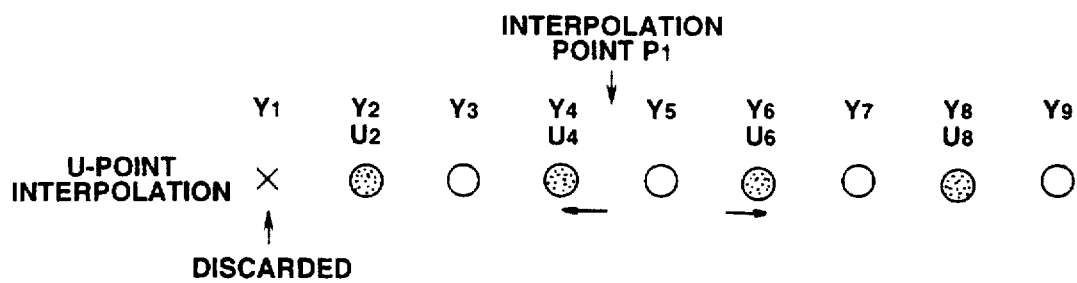
FIG. 9 is a diagrammatic view for illustrating the operation of interpolation of the multi-point interpolation circuit shown in FIG. 3, with the chroma data being chroma data U of D1 format and the address directly before the interpolating point being an even-number address.
Figure 10:
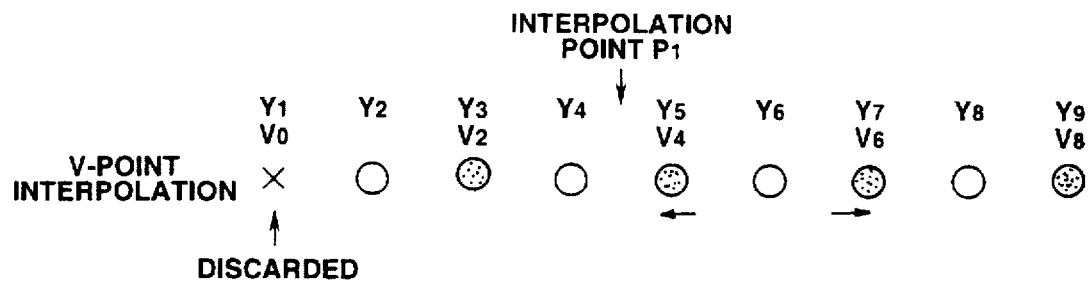
FIG. 10 is a diagrammatic view for illustrating the operation of interpolation of the multi-point interpolation circuit shown in FIG. 3, with the chroma data being chroma data V of D1 format and the address directly before the interpolating point being an even-number address.

The operation for the data being of the D1 format and the interpolating point $P_1$ specifying an address $A_{4.5}$ between the horizontal address $A_4$ and the horizontal address $A_5$, as in a case $C_B$ in FIG. 5, is explained by referring to FIGS. 9 and 10.

The memory controller 16 reads out chroma data $U_2$, $U_4$, $U_6$ and $U_8$ from the memory banks $B_2$, $B_4$, $B_6$ and $B_8$. FIG. 9 shows the positions of the chroma data $U_2$, $U_4$, $U_6$ and $U_8$ with respect to the luminance data $Y_0$, $Y_1$, $Y_2$, $Y_3$, $Y_4$, $Y_5$, $Y_6$, $Y_7$ and $Y_8$ and the interpolating point $P_1$. Since interpolating point $P_1$ is positioned between the horizontal address $A_4$ and the horizontal address $A_5$, the selector 17 selects the left two points of the chroma data $U_4$ and $U_2$, right two points of the chroma data $U_6$ and $U_8$, totalling four chroma data $U_2$, $U_4$, $U_6$ and $U_8$, from data between the chroma data $U_4$ and the chroma data $U_6$.

The memory controller 16 reads out the chroma data $V_0$, $V_2$, $V_4$, $V_6$ and $V_8$ from the memory banks $B_1$, $B_3$, $B_5$, $B_7$ and $B_0$. FIG. 10 shows the positions of the chroma data $V_0$, $V_2$, $V_4$, $V_6$ and $V_8$ with respect to the luminance data $Y_1$, $Y_2$, $Y_3$, $Y_4$, $Y_5$, $Y_6$, $Y_7$, $Y_8$ and $Y_9$ and the interpolating point $P_1$. Since the interpolating point $P_1$ is positioned between the horizontal address $A_4$ and the horizontal address $A_5$, the selector 17 selects the left two points of the chroma data $V_4$ and $V_2$, right two points of the chroma data $V_6$ and $V_8$, totalling four chroma data $V_2$, $V_4$, $V_6$ and $V_8$, from data between the chroma data $V_4$ and the chroma data $V_6$, while discarding the chroma data $V_0$.

Using the eight chroma data, that is chroma data $U_2$, $U_4$, $U_6$ and $U_8$ and the chroma data $V_2$, $V_4$, $V_6$ and $V_8$, selected by the selector 17 from the nine chroma data, the interpolation circuit for C 19 performs multi-point interpolation on the interpolating point $P_1$ and outputs interpolated C data.

Figure 11:
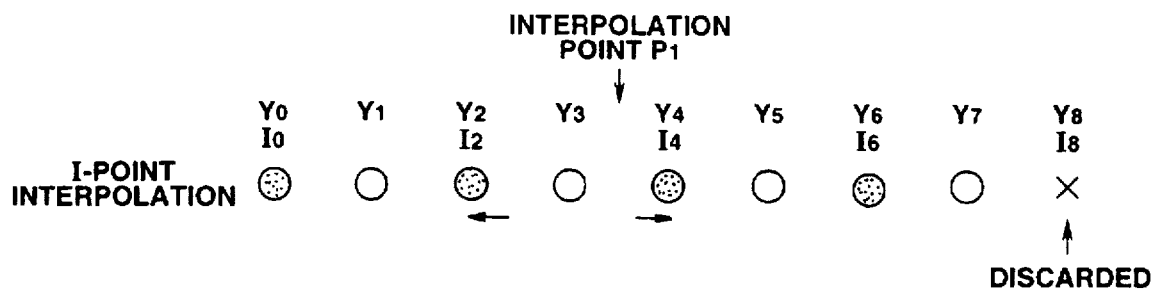
FIG. 11 is a diagrammatic view for illustrating the operation of interpolation of the multi-point interpolation circuit shown in FIG. 3, with the chroma data being chroma data I of D2 format and the address directly before the interpolating point being an odd-number address.
Figure 12:
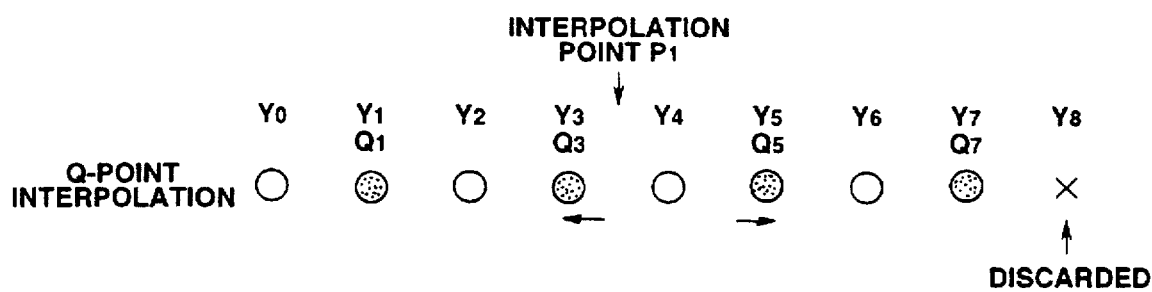
FIG. 12 is a diagrammatic view for illustrating the operation of interpolation of the multi-point interpolation circuit shown in FIG. 3, with the chroma data being chroma data Q of D2 format and the address directly before the interpolating point being an odd-number address.

The operation for the data being of the D2 format and the interpolating point $P_1$ specifying an address $A_{3.5}$ between the horizontal address $A_3$ and the horizontal address $A_4$, as in a case $C_A$ in FIG. 5, is explained. In such case, the chroma data is divided into I data and Q data, as shown in FIGS. 11 and 12.

The memory controller 16 reads out the chroma data $I_0$, $I_2$, $I_4$, $I_6$ and $I_8$ from the memory banks $B_0$, $B_2$, $B_4$, $B_6$ and $B_8$. FIG. 11 shows the positions of the chroma data $I_0$, $I_2$, $I_4$, $I_6$ and $I_8$ with respect to the luminance data $Y_1$, $Y_2$, $Y_3$, $Y_4$, $Y_5$, $Y_6$, $Y_7$, $Y_8$ and $Y_9$ and the interpolating point $P_1$. The even-numbered Y and I data are associated with one another. Since interpolating point $P_1$ is positioned between the horizontal address $A_3$ and the horizontal address $A_4$, the selector 17 selects the left two points of the chroma data $I_2$ and $I_0$, right two points of the chroma data $I_4$ and $I_6$, totalling four chroma data $I_0$, $I_2$, $I_4$ and $I_6$, from data between the chroma data $I_2$ and the chroma data $I_4$, while discarding the chroma data $I_8$. The chroma data $I_0$, $I_2$, $I_4$ and $I_6$ are supplied to the interpolation circuit for C 19.

The memory controller 16 reads out chroma data $Q_1$, $Q_3$, $Q_5$ and $Q_7$ from the memory banks $B_1$, $B_3$, $B_5$ and $B_7$. FIG. 12 shows the positions of the chroma data $Q_1$, $Q_3$, $Q_5$ and $Q_7$ with respect to the luminance data $Y_0$, $Y_1$, $Y_2$, $Y_3$, $Y_4$, $Y_5$, $Y_6$, $Y_7$ and $Y_8$ and the interpolating point $P_1$. Since the interpolating point $P_1$ is positioned between the horizontal address $A_3$ and the horizontal address $A_4$, the selector 17 selects the left two points of the chroma data $Q_3$ and $Q_1$, right two points of the chroma data $Q_5$ and $Q_7$, totalling four chroma data $Q_1$, $Q_3$, $Q_5$ and $Q_7$, from data between the chroma data $Q_3$ and the chroma data $Q_5$. These chroma data $Q_1$, $Q_3$, $Q_5$ and $Q_7$ are sent to the interpolation circuit for C 19.

Using the eight chroma data, that is chroma data $I_0$, $I_2$, $I_4$ and $U_6$ and the chroma data $Q_1$, $Q_3$, $Q_5$ and $Q_7$, selected by the selector 17 from the nine chroma data, the interpolation circuit for C 19 performs multi-point interpolation on the interpolating point $P_1$, and outputs interpolated C data.

Figure 13:
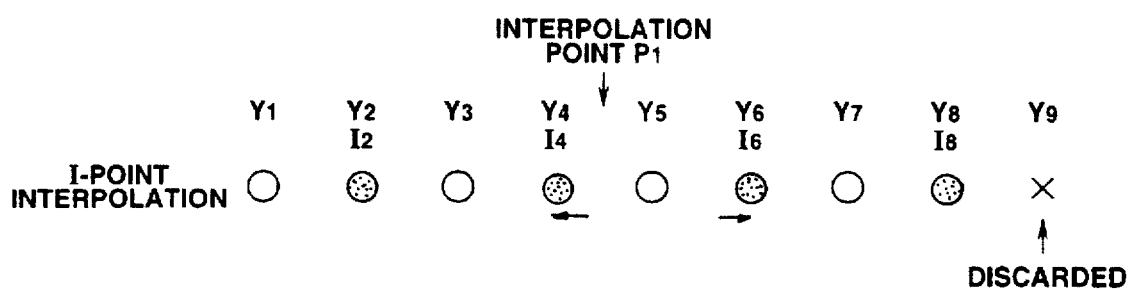
FIG. 13 is a diagrammatic view for illustrating the operation of interpolation of the multi-point interpolation circuit shown in FIG. 3, with the chroma data being chroma data I of D2 format and the address directly before the interpolating point being an even-number address.
Figure 14:
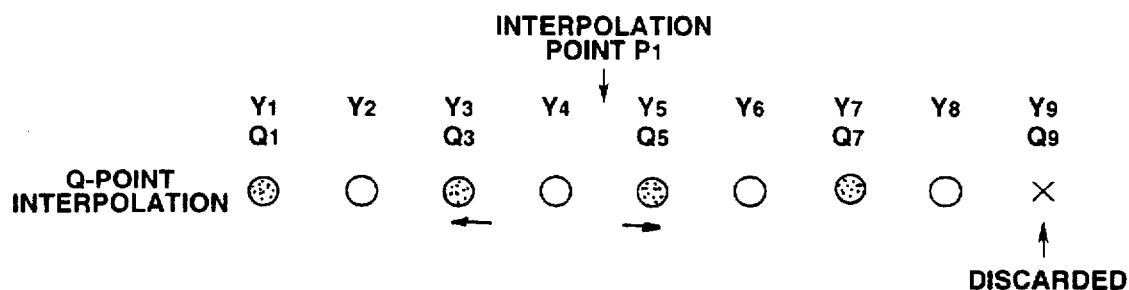
FIG. 14 is a diagrammatic view for illustrating the operation of interpolation of the multi-point interpolation circuit shown in FIG. 3, with the chroma data being chroma data Q of D2 format and the address directly before the interpolating point being an even-number address.

The operation for the data being of the D2 format and the interpolating point $P_1$, specifying an address $A_{4.5}$ between the horizontal address $A_4$ and the horizontal address $A_5$, as in a case $C_B$ in FIG. 5, is now explained by referring to Figs. 13 and 14.

The memory controller 16 reads out the chroma data $I_2$, $I_4$, $I_6$ and $I_8$ from the memory banks $B_2$, $B_4$, $B_6$ and $B_8$. FIG. 13 shows the positions of the chroma data $I_2$, $I_4$, $I_6$ and $I_8$ with respect to the luminance data $Y_1$, $Y_2$, $Y_3$, $Y_4$, $Y_5$, $Y_6$, $Y_7$, $Y_8$ and $Y_9$ and the interpolating point $P_1$. Since interpolating point $P_1$ is positioned between the horizontal address $A_4$ and the horizontal address $A_5$, the selector 17 selects the left two points of the chroma data $I_4$ and $I_2$, right two points of the chroma data $I_6$ and $I_8$, totalling four chroma data $I_2$, $I_4$, $I_6$ and $I_8$, from data between the chroma data $I_4$ and the chroma data $I_6$. The chroma data $I_2$, $I_4$, $I_6$ and $I_8$ are supplied to the interpolation circuit for C 19.

The memory controller 16 reads out chroma data $Q_1$, $Q_3$, $Q_5$, $Q_7$ and $Q_9$ from the memory banks $B_1$, $B_3$, $B_5$, $B_7$ and $B_0$. FIG. 14 shows the positions of the chroma data $Q_1$, $Q_3$, $Q_5$, $Q_7$ and $Q_9$ with respect to the luminance data $Y_1$, $Y_2$, $Y_3$, $Y_4$, $Y_5$, $Y_6$, $Y_7$, $Y_8$ and $Y_9$ and the interpolating point $P_1$. Since the interpolating point $P_1$ is positioned between the horizontal address $A_4$ and the horizontal address $A_5$, the selector 17 selects the left two points of the chroma data $Q_3$ and $Q_1$, right two points of the chroma data $Q_5$ and $Q_7$, totalling four chroma data $Q_1$, $Q_3$, $Q_5$ and $Q_7$, from data between the chroma data $Q_3$ and the chroma data $Q_5$. These chroma data $Q_1$, $Q_3$, $Q_5$ and $Q_7$ are sent to the interpolation circuit for C 19.

Using the eight chroma data, that is chroma data $I_2$, $I_4$, $I_6$ and $U_8$ and the chroma data $Q_1$, $Q_3$, $Q_5$ and $Q_7$, selected by the selector 17 from the nine chroma data, the interpolation circuit for C 19 performs multi-point interpolation on the interpolating point $P_1$ and outputs interpolated C data.

It is seen from above that the multi-point interpolation circuit 19 performs multi-point interpolation of Y and C data of different sampling points, using the same picture memory 15, memory controller 16 and the selector 17.

Figure 15:
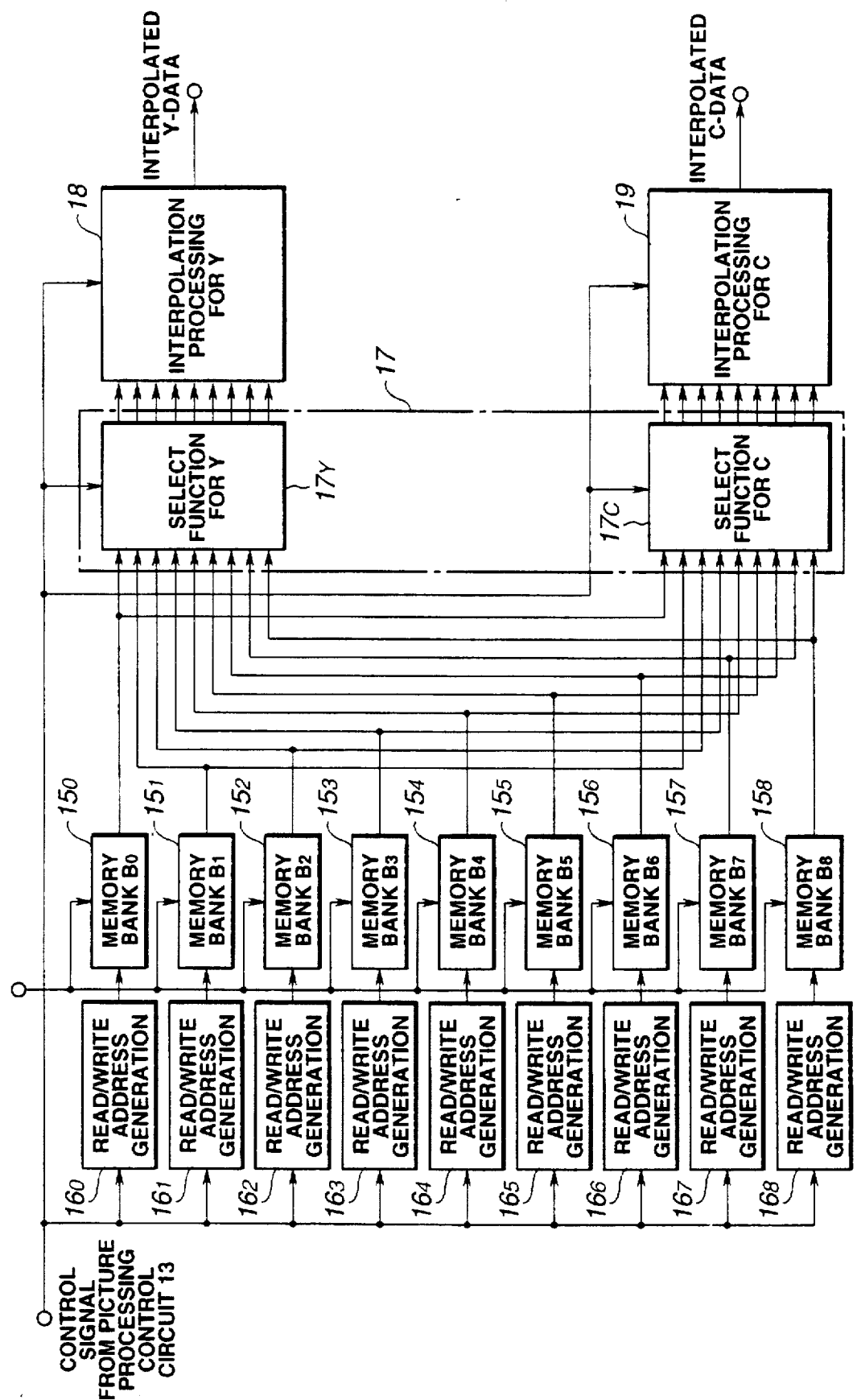
FIG. 15 is a block diagram showing a detailed construction of the multi-point interpolation circuit shown in FIG. 3, with n=8.

Thus the present multi-point interpolation circuit 14 is responsive to the readout addresses generated by nine read/write address generators $16_0$, $16_1$, $16_2$, $16_3$, $16_4$, $16_5$, $16_6$, $16_7$ and $16_8$, making up the memory controller 16, to read out nine Y data and nine C data from, for example, upper eight bits and lower eight bits of picture memory portions $15_0$, $15_1$, $15_2$, $15_3$, $15_4$, $15_5$, $15_6$, $15_7$ and $15_8$ corresponding to the memory banks $B_0$, $B_1$, $B_2$, $B_3$, $B_4$, $B_5$, $B_6$, $B_7$ and $B_8$, respectively, and to transmit the nine Y and C data thus read out to a selection function unit for Y $17_Y$ and to a selection function unit for C $17_C$, as shown in FIG. 15. Meanwhile, the Y data and the C data from the two-dimensional variable LPF are written in, for example, the upper eight bits and in the lower eight bits of the picture memory portions $15_0$, $15_1$, $15_2$, $15_3$, $15_4$, $15_5$, $15_6$, $15_7$ and $15_8$ based upon write addresses from the read/write address generators $16_0$, $16_1$, $16_2$, $16_3$, $16_4$, $16_5$, $16_6$, $16_7$ and $16_8$.

The selection function unit for Y $17_Y$ re-arrays the nine Y data and selects eight points from left to transmit the selected eight points to the interpolation circuit for Y 18. The interpolation circuit for Y 18 performs multi-point interpolation, using the eight Y data, and outputs interpolated Y data.

If the C data is the chroma data of the $D_1$ format and the readout address directly previous to the interpolating point is an even-numbered address, the selection function unit for C $17_C$ re-arrays nine C data and subsequently selects eight of nine C data beginning from the right side C data having the largest readout address, as shown in FIGS. 9 and 10, to transmit the selected eight C data to the interpolation circuit for C 19. Using these eight C data, the interpolation circuit for C 19 performs multi-point interpolation to output the interpolated C data. On the other hand, if the C data is of the $D_1$ format and the readout address directly previous to the interpolation point is an even numbered address, or the C data is of the $D_2$ format, the selection function unit for C $17_C$, re-arrays the C data and selects eight points from left to transmit the selected data to the interpolation circuit for C 19. The interpolation circuit for C 19 performs multi-point interpolation, using the eight C data, and outputs interpolated C data.

Figure 16:
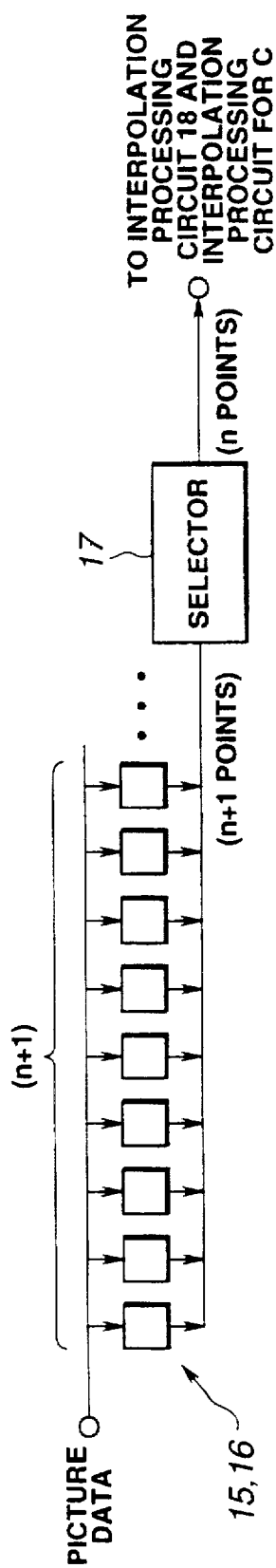
FIG. 16 is a block diagram for illustrating the effect of the multi-point interpolation circuit shown in FIG. 3.

Thus the multi-point interpolation circuit 14, having the construction having (n+1) picture memories 15 and (n+1) memory controllers 16, performs multi-point interpolation on picture data, as shown in FIG. 16. In addition, since the Y data and the C data may be accessed on the same memory, it becomes possible to eliminate the memory and the peripheral circuit thus achieving saving in occupied space and power consumption.

The multi-point interpolation circuit according to the present invention may be configured for nine-point or ten-point interpolation (n=9, 10 and so forth) in place of eight-point interpolation as described above. In addition, the multi-point interpolation circuit may be applied to devices other than the DME processor of the DME apparatus.

What is claimed is:

1. An interpolation apparatus for use with a single picture memory for generating pixel data at a designated interpolating point by n-point interpolation, the apparatus comprising:

memory control means for writing luminance data and chroma data at a same address of the picture memory for each of (n+1) point pixel positions and for reading out the luminance data and the chroma data of the pixel data from the picture memory;

selection means for selecting luminance data and chroma data at n point pixel positions from the luminance data and the chroma data of the pixel data at the (n+1) point pixel positions read out by the memory control means from the picture memory, wherein the n point pixel positions surround the designated interpolating point;

luminance data interpolation means for generating luminance data at the designated interpolating point by performing n-point interpolation of the luminance data of the n point pixel positions selected by the selection means; and chroma data interpolation means for generating chroma data at the designated interpolating point by performing n-point interpolation of the chroma data of the n point pixel positions selected by the selection means.

2. An interpolation apparatus for use with a picture memory for generating pixel data at a designated interpolating point by n-point interpolation the apparatus comprising:

memory control means for writing luminance data and chroma data at a same address of the picture memory for each of (n+1) point pixel positions and for reading out the luminance data and the chroma data of the pixel data from the picture memory;

selection means for selecting luminance data and chroma data at n point pixel positions from the luminance data and the chroma data of pixel data at the (n+1) point pixel positions read out by the memory control means from the picture memory;

luminance data interpolation means for generating luminance data at the designated interpolating point by performing n-point interpolation of the luminance data of the n point pixel positions selected by the selection means; and chroma data interpolation means for generating chroma data at the designated interpolating point by the n-point interpolation of the chroma data of the n point pixel positions selected by the selection means, wherein the luminance data is stored as upper m-bits in a storage area of the picture memory and the chroma data is stored as lower m-bits in the storage area of the picture memory.

3. An interpolation apparatus for use with a picture memory for generating pixel data at a designated interpolating point by n-point interpolation, the apparatus comprising:

memory control means for writing luminance data and chroma data at a same address of the picture memory for each of (n+1) point pixel positions and for reading out the luminance data and the chroma data of the pixel data from the picture memory;

selection means for selecting luminance data and chroma data at n point pixel positions from the luminance data and the chroma data of pixel data at the (n+1) point pixel positions read out by the memory control means from the picture memory, wherein the selection means selects pixel data other than pixel data at a pixel position at one end of the (n+1) point pixel positions if the chroma data has a D1 format and the pixel position directly previous to the designated interpolation point has an address that is an even number, and the selection means selects pixel data other than pixel data at another end of the (n+1) point pixel positions if the address of the pixel position directly previous to the designated interpolation point is an odd number;

luminance data interpolation means for generating luminance data at the designated interpolating point by performing n-point interpolation of the luminance data of the n point pixel positions selected by the selection means; and chroma data interpolation means for generating chroma data at the designated interpolating point by performing n-point interpolation of the chroma data of the n point pixel positions selected by the selection means.

* * * * *